United States Patent [19]

Matsumoto

[11] Patent Number: 4,908,853
[45] Date of Patent: Mar. 13, 1990

[54] DIALING APPARATUS

[75] Inventor: Kohichi Matsumoto, Tokyo, Japan

[73] Assignee: Canon Kabushiki Kaisha, Tokyo, Japan

[21] Appl. No.: 192,652

[22] Filed: May 11, 1988

[30] Foreign Application Priority Data

May 29, 1987 [JP] Japan .................................. 62-137052

[51] Int. Cl.[4] ............................................. H04M 1/27
[52] U.S. Cl. ..................... 379/355; 379/354; 379/356
[58] Field of Search ............... 379/131, 355, 356, 216, 379/357, 358, 354

[56] References Cited

U.S. PATENT DOCUMENTS 4,475,013 10/1984 Lee et al. ......................... 379/131 X

Primary Examiner—James L. Dwyer
Attorney, Agent, or Firm—Fitzpatrick, Cella, Harper & Scinto

[57] ABSTRACT

A dialing apparatus, in which names of stations (or other information identifying the stations) accessible by means of speed-dialing are displayed, e.g., at least one at a time. An operator can change the display to show the next name, and can use a selector key or the like when the name of the desired destination is shown, to instruct the apparatus to dial that station. The names may alternatively be shown several at a time, and the displays may be changed automatically at periodic intervals. A keyboard or the like is used to enter names and dialing numbers of destination stations, to add them to the list of stations accessible through speed-dialing. The place of a new entry in the list can be determined automatically, e.g., by means of a program to sort the names in alphabetical or other predetermined order.

6 Claims, 8 Drawing Sheets

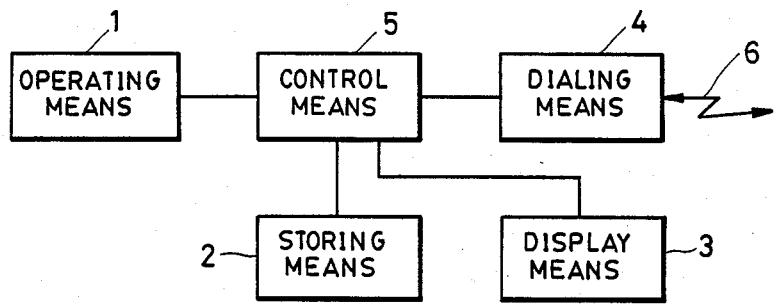
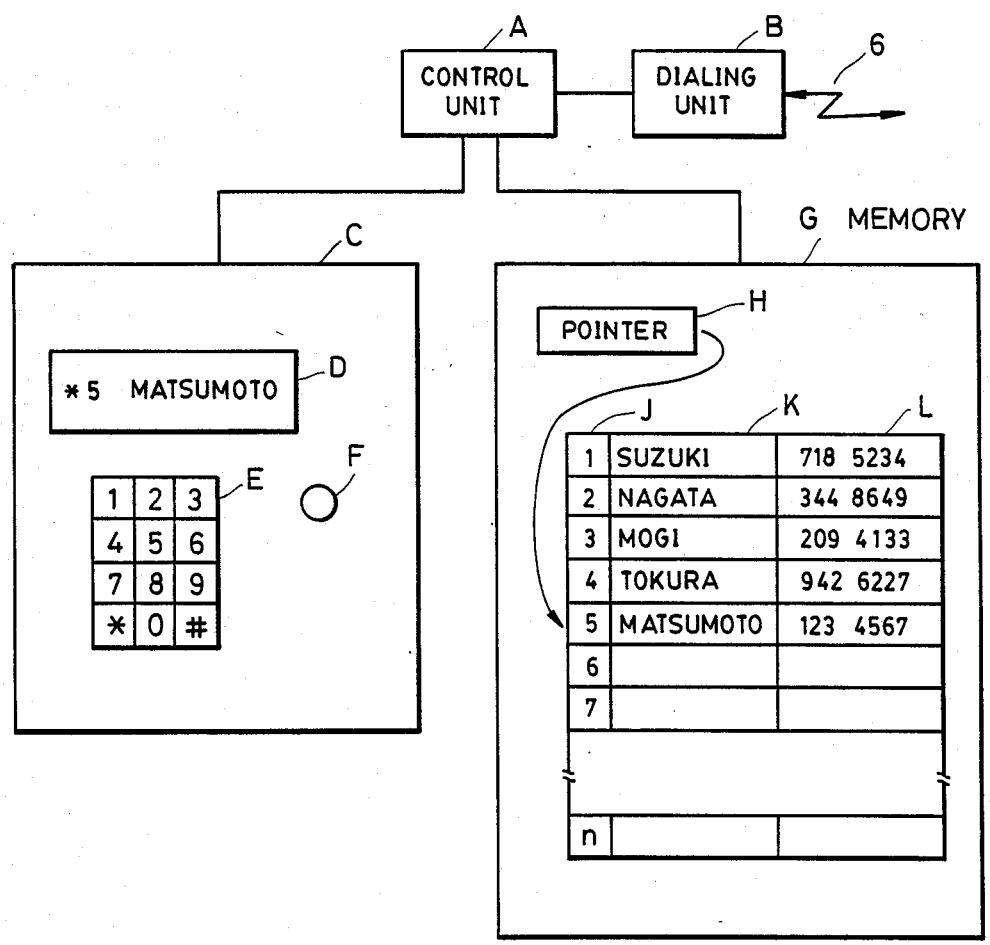

FIG. 6

| | | | | | |
|---|---|---|---|---|---|
| ✶ | 0 --- | A | ✶✶ | 7 | R |
| ✶ | 1 --- | B | ✶✶ | 8 | S |
| ✶ | 2 --- | C | ✶✶ | 9 | T |
| ✶ | 3 --- | D | ✶✶✶ | 0 | U |
| ✶ | 4 | E | ✶✶✶ | 1 | V |
| ✶ | 5 | F | ✶✶✶ | 2 | W |
| ✶ | 6 | G | ✶✶✶ | 3 | X |
| ✶ | 7 | H | ✶✶✶ | 4 | Y |
| ✶ | 8 | I | ✶✶✶ | 5 | Z |
| ✶ | 9 | J | # | | SPACE |
| ✶✶ | 0 | K | # | 0 | , |
| ✶✶ | 1 | L | # | 1 | " |
| ✶✶ | 2 | M | # | 2 | " |
| ✶✶ | 3 | N | # | 3 | . |
| ✶✶ | 4 | O | # | 4 | ! |
| ✶✶ | 5 | P | # | 5 | ? |
| ✶✶ | 6 | Q | | | |

FIG. 7 (A)

| | | |
|---|---|---|
| 1 | ADACHI | 718 5234 |
| 2 | AOKI | 942 6227 |
| 3 | EMOTO | 344 8649 |
| 4 | MATSUMOTO | 123 4567 |
| 5 | NAKAZAWA | 209 4133 |

POINTER → (points to row 4)

| | | |
|---|---|---|
| 1 | ADACHI | 718 5234 |
| 2 | AOKI | 942 6227 |
| 3 | EMOTO | 344 8649 |
| 4 | FUJITA | 418 6358 |
| 5 | MATSUMOTO | 123 4567 |
| 6 | NAKAZAWA | 209 4133 |
| 7 | | |

FIG. 7(C)

| | |
|---|---|
| FUJITA | 418 6358 |

53B

SPEED DIAL
NUMBER

| | TELEPHONE NUMBER LIST |
|---|---|
| 001 | ADACHI |

FIG. 10 (A)

| 001 | ADACHI |
|---|---|
| 002 | AOKI |

FIG. 10 (B)

| 005 | MATSUMOTO |
|---|---|
| 006 | NAKAZAWA |

FIG. 10 (C)

DIALING APPARATUS

BACKGROUND OF THE INVENTION

1. Field of the Invention

The present invention relates to a dialing apparatus for accessing a destination station or terminal.

2. Related Background Art

Speed dialing apparatus are well known. A chart showing the correspondence between the names or titles of destination stations or terminals and the various speed dialing numbers, which each consist of up to a few digits, is provided for the speed dialing apparatus.

Therefore, the operator of such an apparatus has to confirm the dial number of the destination station or terminal using such a chart, making the procedure for dialing less convenient than the present inventors wish to achieve. Further, placement of the chart restricts the product designer's freedom in designing the apparatus.

One aspect of some known speed dialing apparatus is one digit speed dialing. In one digit speed dialing, keys are provided for dialing respective destination stations, and speed dialing can thus be accomplished by one simple touch of the appropriate key. However, the greater the number of keys for one digit speed dialing, the larger the area of the operation panel must be. A large operational panel raises the cost of the apparatus.

SUMMARY OF THE INVENTION

The object of the present invention is to overcome the above-mentioned shortcomings of the conventional dialing apparatus.

According to the present invention, a dialing apparatus is provided which enables the operator to search through the destination names or titles, for example by having them displayed in a predetermined order, to choose the intended destination and to dial by using a relatively small number of keys, without a need for the above-mentioned correspondence chart. Eliminating the need for such a chart also eliminates the restriction which such charts have previously imposed on the task of designing the apparatus.

There have thus been outlined rather broadly some of the more important features of the invention in order that the detailed description of the preferred embodiments thereof that follows ma be better understood, and in order that the present contribution to the art may be better appreciated. There are, of course, additional features of the invention that will be described in that detailed description and the accompanying drawings. Those skilled in the art will appreciate that the conception upon which this disclosure is based may readily be utilized as a basis for designing other structures or methods for carrying out the purposes of the invention. It will be understood, therefore, that the claims are to be regarded as including such other constructions and methods as do not depart from the spirit and scope of the invention.

BRIEF DESCRIPTION OF THE DRAWINGS

FIG. 1 is a functional block diagram of a first preferred embodiment of an apparatus according to the present invention;

FIG. 2 is a diagram showing in more detail several features of the embodiment of FIG. 1;

FIG. 6 is a table showing a relation between characters and key input combinations;

FIGS. 7a-c illustrate a procedure for making a telephone number list;

FIGS. 10(A), 10(B) and 10(C) respectively show display states of the display unit of the embodiment of FIGS. 4 and 5.

DETAILED DESCRIPTION OF THE PREFERRED EMBODIMENTS

A dialing apparatus of the first preferred embodiment, shown in FIGS. 1 and 2, comprises a control unit A for controlling the whole dialing apparatus, a dialing unit B for accessing a telephone switch via a telephone line 6, an operation unit C, which has input keys and a display panel D for displaying telephone numbers and names of destination stations or terminals, as described below, and a storing unit G for storing information pertaining to destination stations or terminals. The input keys include numeral keys E for inputting numerals and a key F for selecting the speed dialing function. The storing unit G stores shortened telephone numbers G for speed dialing, destination names or titles K, and actual (i.e., not abbreviated) telephone numbers L. A pointer H is provided for designating a destination station or terminal from among a plurality of stations or terminals.

The operation of this structure is as follows.

Figure 3:
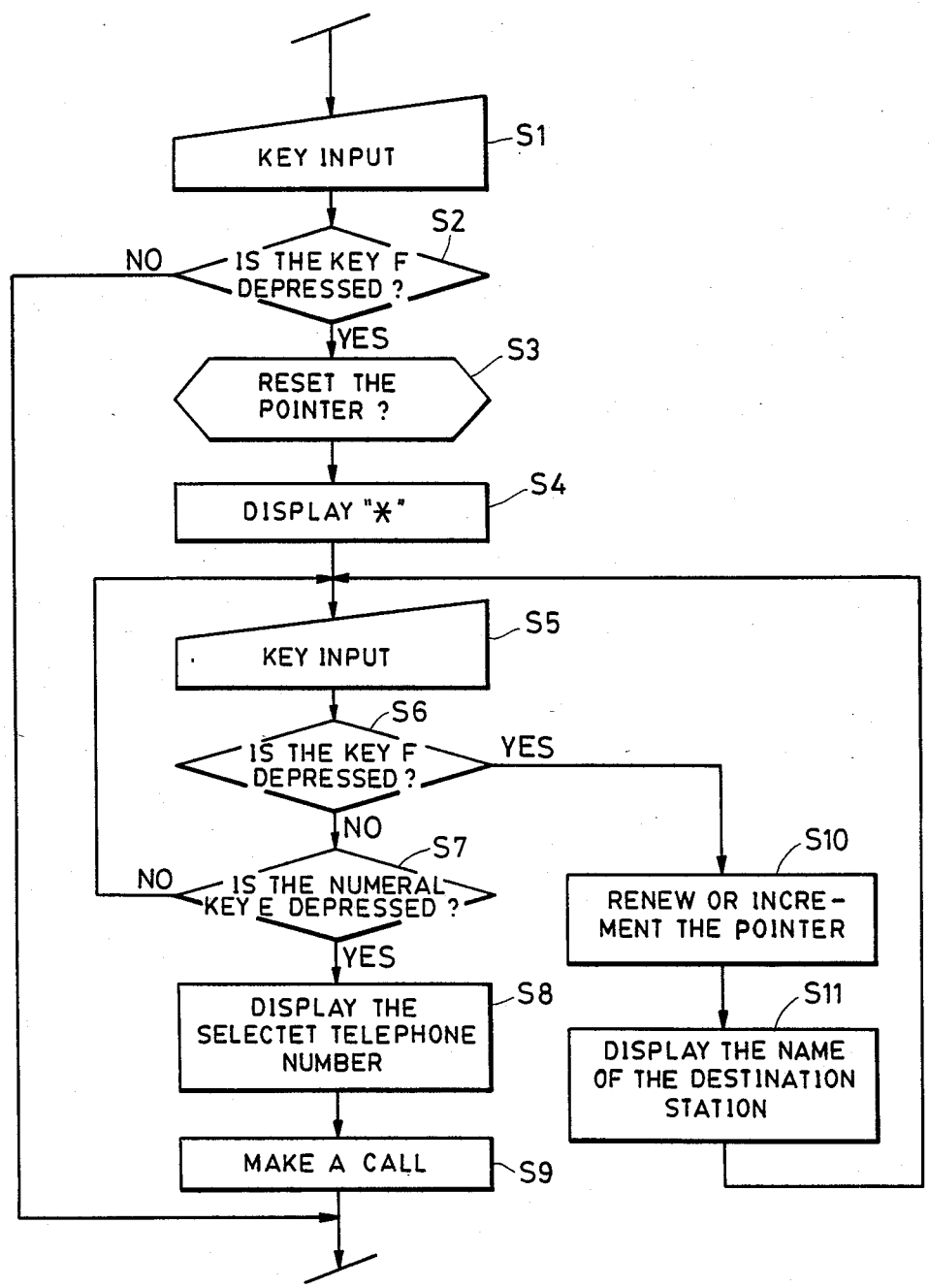
FIG. 3 is a flow chart illustrating a control operation of the embodiment of FIG. 1.

Referring to FIG. 3, the first step S1 is standby routine for awaiting a key input. If the speed dialing select key F is depressed (S2), the pointer is reset to the first position (S3). Then the display unit D displays "*" to inform the operator that the speed dialing function has been selected.

In the step S5, the control unit B awaits the second key input. If the second key input is a second depression of the speed dialing select key F (S6), the pointer H is incremented. That is, the speed dialing select key operates as a scroll key. The name or title K pointed to, and the speed call number J indicated by the pointer H, are provided to the display unit D, which displays them (S11). The operator again depresses the key H and checks the name or title displayed by the display unit D. Upon finding, in this fashion, the destination which it is desired to address, the operator depresses the numeral key E which coincides with the speed call number on the display unit D (S7). Then the actual telephone number is also provided to the display unit D and is displayed (S8), and is also provided to the dialing unit B. The control unit A causes the dialing unit B to dial the displayed telephone number (S9).

In FIG. 1 the operating means 1 includes the numeral keys E and the speed dialing select key F. Storing means 2, display means 3 and dialing means 4 respectively correspond to the storing unit G, the display unit D and the dialing unit B.

Referring to FIG. 4 through FIG. 10, a second preferred embodiment of the present invention is described.

Figure 4:
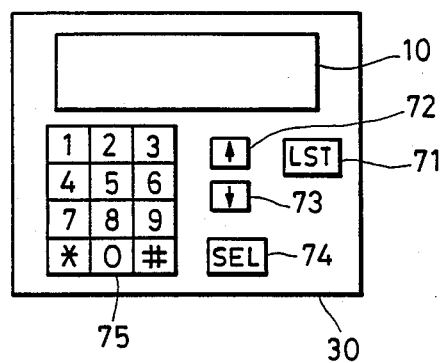
FIG. 4 is a top view of an operation panel of a second preferred embodiment of an apparatus according to the invention.

FIG. 4 shows an operation panel 30, and the operation panel 30 has a liquid crystal display unit 10, and a number of input keys 71, 72, 73, 74 nd 75. The input keys includes a telephone number list key 71 for designating that a search is to be performed for one of the telephone numbers listed in a memory; a forward scroll key 72 for scrolling the telephone number list forward; a backward scroll key 73 for scrolling the telephone number list backward; a selecting key 74 for selecting a destination from the telephone number list; and numerical keys 7 for inputting numbers and for registering names or titles of destination terminals and corresponding telephone numbers.

Figure 5:
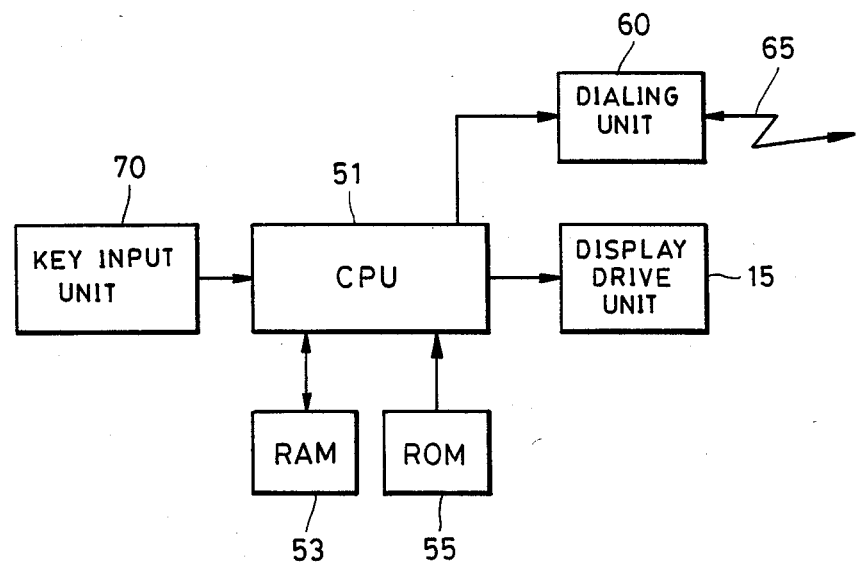
FIG. 5 is a block diagram of the second preferred embodiment.

FIG. 5 shows a block diagram of the second embodiment. As shown in FIG. 5, CPU 51 is provided for processing control peripheral units. RAM 53 is provided for storing data, especially the telephone number list. ROM 55 is provided for storing software which CPU 51 executes. A dialing unit 60 is provided for dialing a call to go out via a telephone line 65.

A display drive unit 15 drives the display unit 10, and a key input unit 70 includes the keys 71, 72, 73, 74 and 75 in FIG. 4.

The operation for registering the telephone number list is described as follows.

The telephone number list is registered in the RAM 53 so as automatically to sort the names of destination stations in a predetermined order, e.g., alphabetical order, as shown in FIG. 7.

The name of each destination station is input by using numeral keys 75. Each character is input using a combination of a key "*" or "#" and numeral keys, as shown in FIG. 6.

Figure 8:
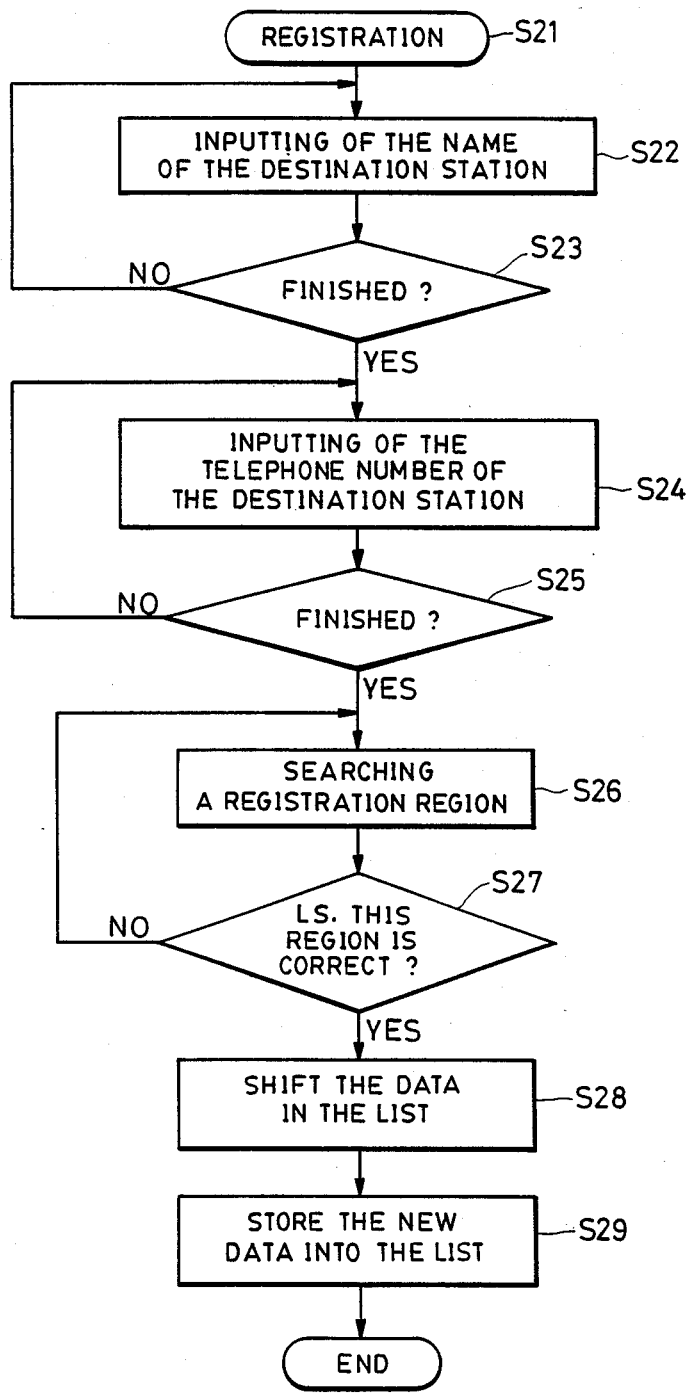
FIG. 8 is a flow chart illustrating a control operation in a registration mode.

FIG. 8 shows a flow chart illustrating a control operation for registration of the telephone number list.

First, a registration mode is begun, after the operator depresses the key "#" three times. In the step S21, the name of the destination station is input. In order to input the name, the CPU 51 reads out a message "PLEASE INPUT THE NAME OF THE DESTINATION STATION" from the RAM 53, and causes the display unit 10 to display this message. Then the CPU 51 waits for the operator to input the name. After the operator has done so in accordance with the table shown in FIG. 6, the CPU 51 stores sequentially input character code data in a buffer memory in the RAM 53. For example, the buffer memory has a capacity to store 20 characters of code data. When finished entering the name, the operator depresses the key 71. The CPU 51 judges when the process of entering the name has been completed, by checking whether the key 71 is depressed or not (S21).

In the step S23, which follows depression of key 71, the CPU 51 reads out a message "PLEASE INPUT THE TELEPHONE NUMBER" from the RAM 53, and causes the display unit 50 to display the message. The telephone number is entered by the operator by using numeral keys 75, and is stored in the buffer memory in the RAM 53. The buffer memory has a capacity for storing up to 20 digits in this embodiment.

The operator depresses the key 71, and the CPU 51 judges that entering of the telephone number in the step S24 has been completed, and advances to the step S25.

In the steps S25 and S26, the CPU 51 reads out the first character code in the buffer memory, and compares the first character code in the buffer memory to a first character code in the telephone number list, to arrange the names of destination stations in alphabetical order.

If the first character code in the buffer memory is the same as that in the list, the CPU 51 compares the second character code in the buffer memory to that in the list. In the same way, if the second character codes are the same, the third character codes are compared. In this way, the region where the character code data in the buffer memory should be placed in the telephone number list is decided.

As shown in FIG. 7, the newly input name and number of the destination station in the buffer memory 53B are registered in the list 53L in alphabetical order.

Assuming the newly input telephone data is placed, e.g., fourth in the list, the data which were previously fourth or later in the list are each shifted by one place (S27). In the step S28, the character code data and the telephone number data of the destination station are entered or registered in the list 53L from the buffer memory 53B. As mentioned above, registration to the telephone number list is performed so that, the names of the destination stations line up in the list in alphabetical order.

A selection mode for selecting a destination station among a plurality of stations in the list, is as follows.

Figure 9:
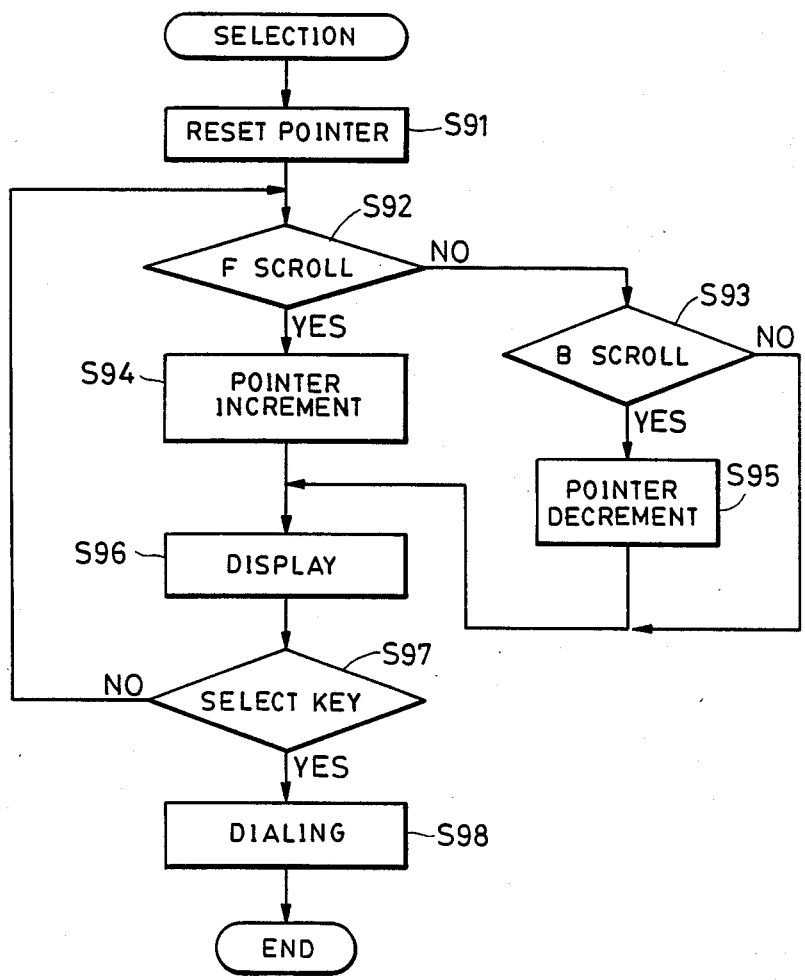
FIG. 9 is a flow chart illustrating a control operation in a selection mode.

When the key 71 is depressed, the CPU 51 executes a program, shown in FIG. 9, illustrating operation in the selection mode.

In the step S91, a pointer for designating a destination station is reset to the first position. Then the CPU 51 reads out the first telephone data and a message "TELEPHONE NUMBER LIST" from the RAM 53, and causes the display unit 10 to display them as shown in FIG. 10(A).

In the steps S92 and S93, the CPU checks whether the scroll keys 72, 73 are depressed or not. If the forward scroll key 72 is depressed, the pointer is incremented (S94), and the CPU 51 causes the display unit 10 to display the second telephone data, as shown in FIG. 10(B). If the backward scroll key 73 is depressed, the pointer is decremented (S95).

When the operator sees that the display unit 10 is showing the name of the destination station it is wished to call, the operator depresses the selection key 74. The CPU 52 then reads out the telephone number designated by the pointer, sends the number to the dialing unit 60 and causes the dialing unit 60 to dial the number to make a call to the destination station (S98).

If the operator depresses the select key 74 when the display unit 10 display is as shown in FIG. 10(C), the dialing unit makes a call to "MATSUMOTO".

In this embodiment, the select key 74 is provided for selecting a destination station. However, the destination station can be selected by inputting the speed dial number displayed by the display unit 10 with the name of the desired destination station.

Further, in the first and the second embodiments, when the key F or one of the scroll keys 72, 73 is depressed, the pointer is incremented or decremented, as the case may be, by one.

However, if, for example, the key F or 72 is continuously depressed for longer than a predetermined time, the pointer is shifted to the place in the list where the first name which begins with the next character of the alphabet exists (for example, A→B→C).

As mentioned above, with an apparatus constructed according to the present invention, the operator can easily search out the destination name to which it is desired to make a call, without the need for a space-consuming correspondence chart and the attendant restriction upon the design of the exact size and shape of the apparatus.

Although a few particular embodiments of the invention are herein described in detail for purposes of explanation, various modifications thereof, after study of this specification, will be apparent to those skilled in the art to which the invention pertains. For example, names and numbers of the destination stations could be maintained in other than alphabetical order, in which case the program for automatically rearranging the list to put it in the desired order after entry of the name and number of a new distinction station will accordingly be different from the one described herein. Again, the names could be displayed one after another, e.g., at predetermined intervals, once the operator depresses the key F. Also, the names could be displayed several at a time, with the operator using appropriate means within the ordinary level of skill in the art to select the desired destination station, such as a cursor, a light pen, etc.

What is claimed is:

1. A dialing apparatus for accessing a destination station, comprising:
    a memory for storing information, including a name and a dialing number, for each of a plurality of destination stations;
    display means, arranged to display at least the name of one destination station at a time from among the plurality of destination stations;
    a key for altering the names of destination stations displayed on said display means in a predetermined order;
    control means for shifting the names of destination stations displayed on said display means, in the predetermined order according to the input of said key;
    a selector for selecting a dialing number; and
    dialing means for dialing the dialing number of the destination station displayed on said display means based on the selection made by said selector.

2. A dialing apparatus according to claim 1, wherein said memory means stores the dialing numbers in a predetermined order.

3. A dialing apparatus according to claim 1, further comprising:
    means for registering a name and a dialing number in said memory; and
    means for altering the predetermined order in accordance with the name registered by said registering means.

4. A dialing apparatus according to claim 1, wherein said selector selects dialing in response to the input of a speed dialing number.

5. A dialing apparatus according to claim 4, wherein said display unit means displays the speed dialing number together with the name of the destination station to which the speed dialing number corresponds.

6. A dialing apparatus according to claim 3 wherein said altering means alters the order of storing in said memory.

* * * * *